United States Patent
Yanaizumi et al.

(10) Patent No.: US 9,896,550 B2
(45) Date of Patent: Feb. 20, 2018

(54) EPOXY-MODIFIED SILICONE RESIN, MAKING METHOD, CURABLE COMPOSITION, AND ELECTRONIC PART

(71) Applicant: SHIN-ETSU CHEMICAL CO., LTD., Tokyo (JP)

(72) Inventors: Kazuhide Yanaizumi, Annaka (JP); Hideyoshi Yanagisawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/397,888

(22) Filed: Jan. 4, 2017

(65) Prior Publication Data

US 2017/0198102 A1 Jul. 13, 2017

(30) Foreign Application Priority Data

Jan. 7, 2016 (JP) ................................. 2016-001921

(51) Int. Cl.
*C08G 77/52* (2006.01)

(52) U.S. Cl.
CPC .................... *C08G 77/52* (2013.01)

(58) Field of Classification Search
None
See application file for complete search history.

(56) References Cited

U.S. PATENT DOCUMENTS

| 4,877,822 A | 10/1989 | Itoh et al. | |
|---|---|---|---|
| 2002/0192477 A1* | 12/2002 | Honda | C08G 59/306 428/447 |
| 2003/0078322 A1* | 4/2003 | Honda | C08G 59/306 523/400 |
| 2011/0076465 A1 | 3/2011 | Takeda et al. | |
| 2011/0143092 A1* | 6/2011 | Asai | C08G 77/52 428/141 |
| 2012/0094222 A1* | 4/2012 | Soga | G03F 7/0045 430/17 |
| 2012/0108762 A1* | 5/2012 | Kondo | C08G 77/14 525/476 |
| 2012/0213993 A1* | 8/2012 | Takeda | C08G 77/14 428/355 EP |

FOREIGN PATENT DOCUMENTS

| JP | 62-84147 A | 4/1987 |
|---|---|---|
| JP | 11-130838 A | 5/1999 |

OTHER PUBLICATIONS

Extended European Search Report dated May 18, 2017, issued in counterpart European Patent Application No. 16207330.8. (6 pages).

* cited by examiner

*Primary Examiner* — Robert S Loewe
(74) *Attorney, Agent, or Firm* — Westerman, Hattori, Daniels & Adrian, LLP

(57) ABSTRACT

An epoxy-modified silicone resin obtained using a compound having 3 or 4 glycidyl groups and 3 or 4 (meth)allyl groups in the molecule is novel. A curable composition comprising the epoxy-modified silicone resin cures into a film having improved heat resistance and adhesion.

9 Claims, No Drawings

EPOXY-MODIFIED SILICONE RESIN, MAKING METHOD, CURABLE COMPOSITION, AND ELECTRONIC PART

CROSS-REFERENCE TO RELATED APPLICATION

This non-provisional application claims priority under 35 U.S.C. § 119(a) on Patent Application No. 2016-001921 filed in Japan on Jan. 7, 2016, the entire contents of which are hereby incorporated by reference.

TECHNICAL FIELD

This invention relates to an epoxy-modified silicone resin, a method for preparing the silicone resin, a curable composition comprising the silicone resin, and an electronic part comprising the composition.

BACKGROUND ART

The recent trend in the semiconductor technology is toward wafers having a larger diameter and a reduced thickness. Accordingly, resin materials having higher functions are required to meet the demand for electronic materials of reduced size and higher precision. Because of their adhesion, heat resistance and moisture resistance, epoxy base materials are frequently used as the resin material for semiconductor devices and electronic parts. It is desirable that epoxy and phenolic resins having adhesion, heat resistance and moisture resistance are endowed with insulation and flexibility of silicone. Patent Document 1 proposes to modify a (meth)allyl-containing epoxy compound with a silicone. However, reaction of a compound having at least three glycidyl groups and at least three (meth)allyl groups in the molecule is unknown.

Patent Document 2 discloses a compound having epoxy and allyl groups, represented by the following formula:

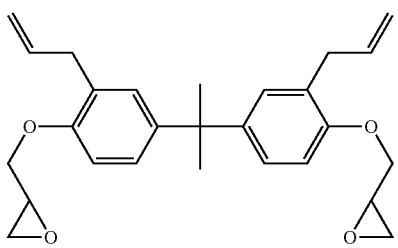 [SMILES: C=CCc1cc(C(C)(C)c2ccc(OCC3CO3)c(CC=C)c2)ccc1OCC1CO1]

which is commercially available under the trade name of RE-810NM from Nippon Kayaku Co., Ltd. A polymer formed by linking allyl groups on the compound is linear, and thus poor in heat resistance and bond strength when exposed to high temperature atmosphere.

CITATION LIST

Patent Document 1: JP-A S62-084147
Patent Document 2: JP-A H11-130838

SUMMARY OF INVENTION

An object of the invention is to provide an epoxy-modified silicone resin and its preparation method which overcome the aforementioned problems by using a specific epoxy compound, a curable composition comprising the silicone resin, and an electronic part comprising the composition in the cured state.

The inventors have found that an epoxy-modified silicone resin having the general formula (1):

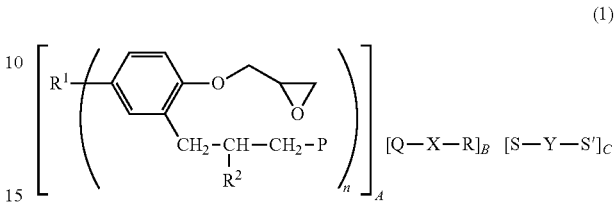

(1)

wherein $R^1$, $R^2$, P, n, Q-X—R, S—Y—S', A, B and C are defined below is useful, and that a curable composition comprising the epoxy-modified silicone resin cures into a product having heat resistance and adhesion upon exposure to high temperature atmosphere.

In one aspect, the invention provides an epoxy-modified silicone resin having a weight average molecular weight of 3,000 to 500,000, represented by the general formula (1).

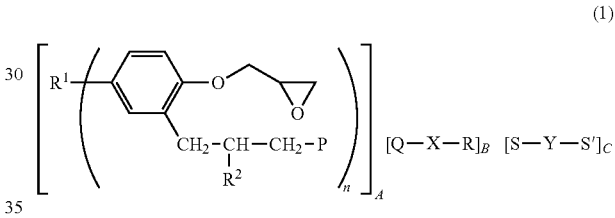

(1)

Herein $R^1$ is a trivalent or tetravalent $C_3$-$C_{20}$ hydrocarbon group, $R^2$ is hydrogen or methyl, n is 3 or 4, A is a number of 0.05 to 0.6, B is a number of 0.3 to 0.8, C is a number of 0 to 0.6, A+B+C=1; Q-X-R is independently an organic group of the following formula (2), (3) or (4)

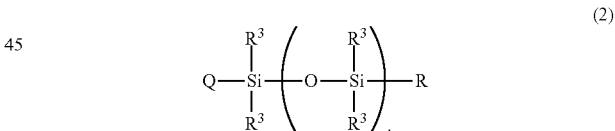

(2)

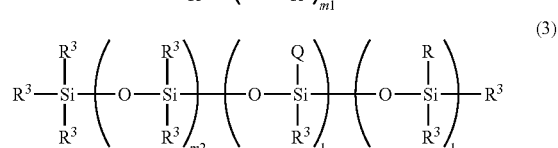

(3)

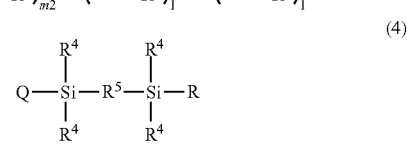

(4)

wherein $R^3$ is independently a substituted or unsubstituted, $C_1$-$C_8$ monovalent hydrocarbon group, $R^4$ is independently a $C_1$-$C_8$ monovalent hydrocarbon group, R is a $C_1$-$C_{16}$ divalent hydrocarbon group, m1 is a positive number of 1 to 1,000, m2 is a number of 0 to 998; S—Y—S' is independently an organic group of the following formula (5), (6), (7) or (8):

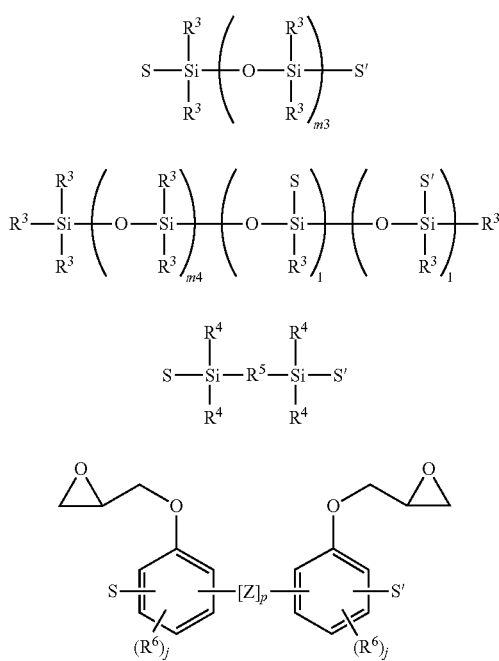

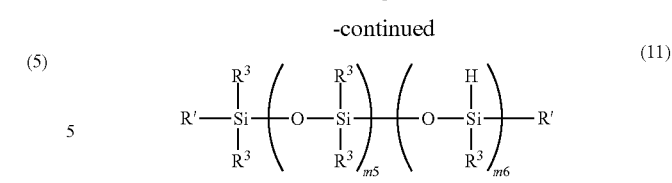

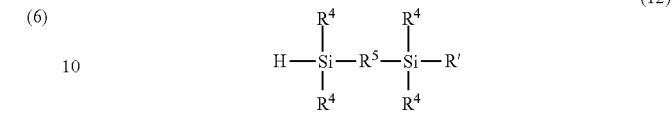

wherein $R^3$, $R^4$, and $R^5$ are as defined above, m3 is a positive number of 1 to 1,000, m4 is a number of 0 to 998, Z is a $C_1$-$C_{15}$ divalent organic group, p is 0 or 1, $R^6$ which may be the same or different is a $C_1$-$C_4$ alkyl or alkoxy group, j is 0, 1 or 2; P and Q each designate a valence bond, P bonds to Q, R is $R^3$ or a valence bond to P or S, S is —$(CH_2)_h$— to bond to R, h is 2 or 3, and S' is $R^3$ or S.

Preferably, A+B is 0.4 to 1.0.

In a second aspect, the invention provides a method for preparing an epoxy-modified silicone resin having a weight average molecular weight of 3,000 to 500,000, comprising the step of reacting an alkenyl-containing compound including a (meth)allyl-containing epoxy compound having the general formula (9) with at least one compound selected from compounds having the general formulae (10) to (12).

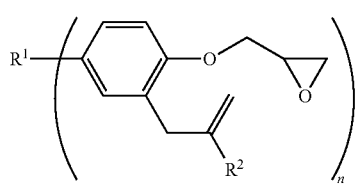

Herein $R^1$ is a trivalent or tetravalent $C_3$-$C_{20}$ hydrocarbon group, $R^2$ is hydrogen or methyl, and n is 3 or 4.

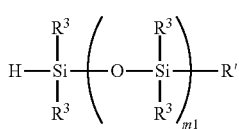

Herein $R^3$ is independently a substituted or unsubstituted, $C_1$-$C_8$ monovalent hydrocarbon group, $R^4$ is independently a $C_1$-$C_8$ monovalent hydrocarbon group, $R^5$ is a $C_1$-$C_{15}$ divalent hydrocarbon group, m1 is a positive number of 1 to 1,000, m5 is a number of 0 to 999, m6 is a number of 1 to 100, m5+m6 is a positive number of 1 to 1,000, and R' is independently hydrogen or $R^3$.

In a preferred embodiment, 1 mole of the (meth)allyl-containing epoxy compound having formula (9) is reacted with 1 to 10 moles of the compound having formula (10), (11) or (12).

In a preferred embodiment, the alkenyl-containing compound includes, in addition to the (meth)allyl-containing epoxy compound having formula (9), at least one compound selected from compounds having formulae (13) to (16).

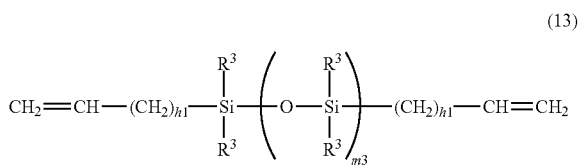

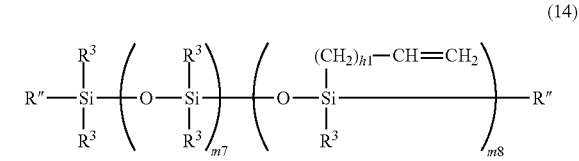

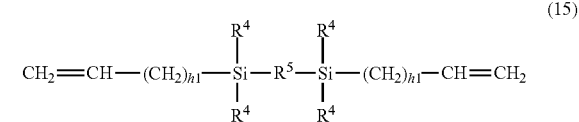

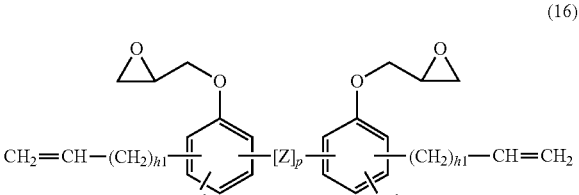

Herein $R^3$, $R^4$, and $R^5$ are as defined above, m3 is a positive number of 1 to 1,000, m7 is a number of 0 to 999, m8 is a number of 1 to 100, m7+m8 is a positive number of 1 to 1,000, R" is independently —$(CH_2)_{h1}$—CH=$CH_2$ or $R^3$, h1 is 0 or 1, Z is a $C_1$-$C_{15}$ divalent organic group, p is 0 or 1, $R^6$ which may be the same or different is a $C_1$-$C_4$ alkyl or alkoxy group, and j is 0, 1 or 2.

Also preferably, in the reacting step, the (meth)allyl-containing epoxy compound having formula (9), the compound selected from formulae (13) to (16), and the compound selected from formulae (10) to (12) are combined in a molar ratio of 0.05-0.6:0.05-0.6:0.3-0.8. An appropriate amount of organosiloxanes is 20 to 80% by weight based on the total weight of compounds involved in the reaction.

In a third aspect, the invention provides a curable composition comprising the epoxy-modified silicone resin defined above and a crosslinker.

In a fourth aspect, the invention provides an electronic part comprising a cured product of the curable composition.

Advantageous Effects of Invention

The epoxy-modified silicone resin is obtained by modifying a silicone with a compound having at least three glycidyl groups and at least three (meth)allyl groups in the molecule according to the invention. The epoxy-modified silicone resin is used to formulate a curable composition which cures into a product having heat resistance and adhesion upon exposure to high temperature. The composition is useful as a heat resistant resin material.

DESCRIPTION OF PREFERRED EMBODIMENTS

As used herein, the notation (Cn-Cm) means a group containing from n to m carbon atoms per group.

Epoxy-Modified Silicone Resin

One embodiment of the invention is an epoxy-modified silicone resin having a weight average molecular weight of 3,000 to 500,000, represented by the general formula (1).

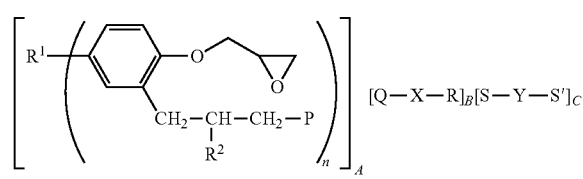

(1)

Herein $R^1$ is a trivalent or tetravalent $C_3$-$C_{20}$ hydrocarbon group, $R^2$ is hydrogen or methyl, n is 3 or 4, A is a number of 0.05 to 0.6, B is a number of 0.3 to 0.8, C is a number of 0 to 0.6, and A+B+C=1. Q-X-R is independently an organic group of the following formula (2), (3) or (4).

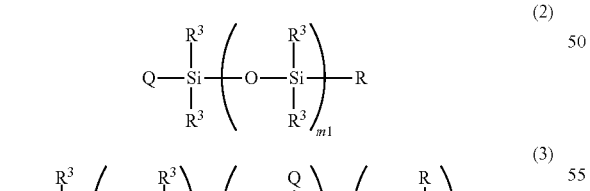

(2)

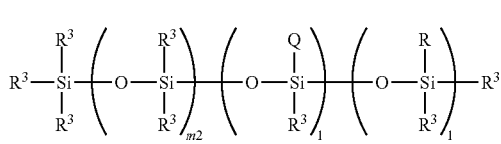

(3)

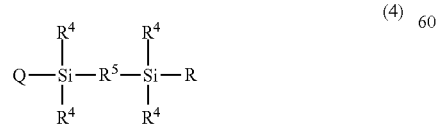

(4)

Herein $R^3$ is independently a substituted or unsubstituted, $C_1$-$C_8$ monovalent hydrocarbon group, $R^4$ is independently a $C_1$-$C_8$ monovalent hydrocarbon group, $R^5$ is a $C_1$-$C_{15}$ divalent hydrocarbon group, m1 is a positive number of 1 to 1,000, and m2 is a number of 0 to 998. S—Y—S' is independently an organic group of the following formula (5), (6), (7) or (8).

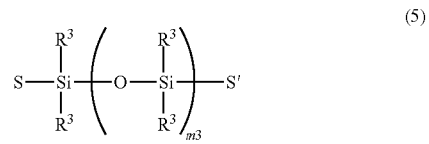

(5)

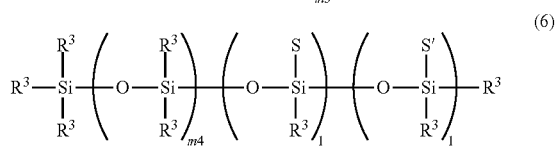

(6)

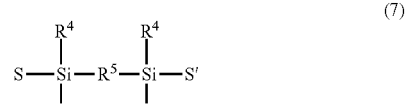

(7)

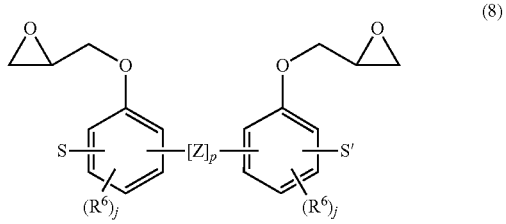

(8)

Herein $R^3$, $R^4$, and $R^5$ are as defined above, m3 is a positive number of 1 to 1,000, m4 is a number of 0 to 998, Z is a $C_1$-$C_{15}$ divalent organic group, p is 0 or 1, $R^6$ which may be the same or different is a $C_1$-$C_4$ alkyl or alkoxy group, j is 0, 1 or 2. P and Q each designate a valence bond, P bonds to Q, R is $R^3$ or a valence bond to P or S, S is —$(CH_2)_h$— to bond to R, h is 2 or 3, and S' is $R^3$ or S.

In formula (1), $R^1$ is a tri- or tetravalent hydrocarbon group of 3 to 20 carbon atoms, preferably 3 to 15 carbon atoms. Specifically, $R^1$ is a substituted or unsubstituted tri- or tetravalent hydrocarbon group containing one or more, linear or branched aliphatic groups, alicyclic groups or aromatic groups. These linear or branched aliphatic groups, alicyclic groups, and aromatic groups may be contained alone or in combination of two or more.

Examples of the hydrocarbon group include n-propyl, isopropyl, n-butyl, isobutyl, t-butyl, pentyl, hexyl, cyclopentyl, cyclohexyl, bicyclohexyl, dicyclohexylmethyl, phenyl, tolyl, xylyl, benzyl, phenylethyl, phenylpropyl, methylbenzyl, and combinations thereof, with two or three hydrogen atoms being eliminated, which may be substituted or unsubstituted.

Preferably, $R^1$ is a tri- or tetravalent hydrocarbon group of at least 6 carbon atoms containing an aromatic group (aromatic ring) or alicyclic group (aliphatic ring), with the following groups being more preferred.

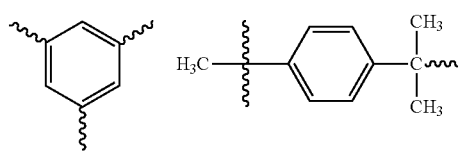

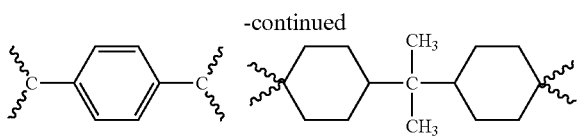

Herein the wavy line designates a valence bond.

$R^2$ is hydrogen or methyl, and n is 3 or 4. A is a number of 0.05 to 0.6, preferably 0.05 to 0.4; B is a number of 0.3 to 0.8, preferably 0.4 to 0.8; C is a number of 0 to 0.6, preferably 0 to 0.5; and A+B+C=1. Also preferably, A+B is in a range of 0.4 to 1.0, more preferably 0.5 to 1.0.

P and Q each designate a valence bond, P bonds to Q, R represents $R^3$ or a valence bond to P or S. S is $-(CH_2)_h-$ to bond to R; h is 2 or 3, preferably 2; and S' represents $R^3$ or S.

In formulae (2) and (3), $R^3$ is a substituted or unsubstituted monovalent hydrocarbon group of 1 to 8 carbon atoms, more specifically 1 to 6 carbon atoms, preferably free of aliphatic unsaturation. Suitable hydrocarbon groups include alkyl groups such as methyl, ethyl, propyl, butyl, pentyl, hexyl, and octyl; aryl groups such as phenyl, tolyl and xylyl; aralkyl groups such as benzyl and phenylethyl; and substituted forms of the foregoing in which one or more or even all hydrogen atoms are substituted by halogen (e.g., fluoro, bromo, chloro), cyano or the like, such as chloromethyl, chloropropyl, bromoethyl, trifluoropropyl, and cyanoethyl. Inter alia, methyl is most preferred. The subscript m1 is a positive number of 1 to 1,000, preferably 1 to 100, and m2 is a number of 0 to 998, preferably 0 to 100.

In formulae (4) and (7), $R^4$ is a monovalent hydrocarbon group of 1 to 8 carbon atoms, more specifically 1 to 6 carbon atoms, and $R^5$ is a divalent hydrocarbon group of 1 to 15 carbon atoms, more specifically 1 to 10 carbon atoms. Typical examples of $R^4$ include alkyl groups such as methyl, ethyl, propyl and butyl. Typical examples of $R^5$ include alkylene groups such as methylene, ethylene, propylene, butylene, pentylene and hexylene, and arylene groups such as phenylene. It is preferred for availability of starting reactants that $R^4$ be methyl and $R^5$ be methylene, ethylene or phenylene.

In formulae (5) and (6), $R^3$ is as defined and exemplified above. The subscript m3 is a positive number of 1 to 1,000, preferably 1 to 100, and m4 is a number of 0 to 998, preferably 0 to 100.

In formula (8), Z is a $C_1$-$C_{15}$ divalent organic group. Divalent hydrocarbon groups are typical, including alkylene groups such as methylene, ethylene, propylene (trimethylene, methylethylene, dimethylmethylene), butylene (tetramethylene, methylpropylene), hexamethylene and octamethylene, and arylene groups such as phenylene, tolylene and naphthylene, in which one or more hydrogen may be substituted by halogen (e.g., chloro, fluoro, bromo). Preferred groups are shown below.

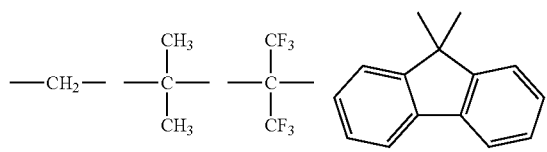

$R^6$ which may be the same or different is selected from $C_1$-$C_4$ alkyl groups such as methyl, ethyl, propyl and butyl, and $C_1$-$C_4$ alkoxy groups such as methoxy and ethoxy, p is 0 or 1, and j is 0, 1 or 2.

The epoxy-modified silicone resin should have a weight average molecular weight (Mw) of 3,000 to 500,000, preferably 10,000 to 70,000. With too low a Mw, mechanical properties are compromised. With too high a Mw, solvent solubility is compromised. It is noted throughout the disclosure that Mw is measured versus monodisperse polystyrene standards by gel permeation chromatography (GPC) using tetrahydrofuran as developing solvent.

While the epoxy-modified silicone resin contains organosiloxy groups, the total content of organosiloxy groups is preferably 20 to 80% by weight, more preferably 25 to 75% by weight. If the organosiloxy content is less than 20 wt %, the silicone resin may lose flexibility and its film may crack. A silicone resin with an organosiloxy content in excess of 80 wt % may not have sufficient heat resistance. Since the epoxy-modified silicone resin having an organosiloxy content within the range has heat resistance and maintains satisfactory adhesion after high temperature exposure, it is advantageously used as a resin material for semiconductor devices and electronic parts.

The epoxy-modified silicone resin having a Mw of 3,000 to 500,000, represented by formula (1), may be prepared by reacting an alkenyl-containing compound including a (meth)allyl-containing epoxy compound having the general formula (9) with at least one compound selected from compounds having the general formulae (10) to (12)

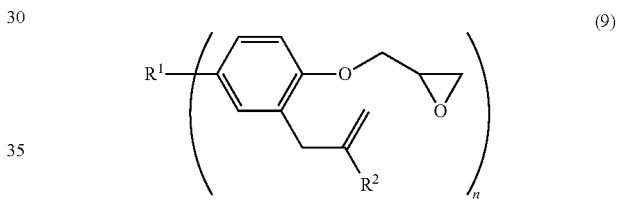

Herein $R^1$, $R^2$, and n are as defined above.

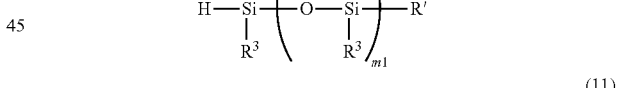

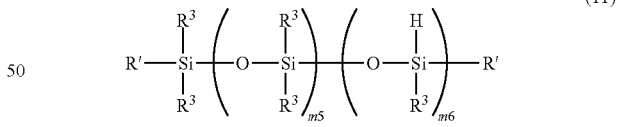

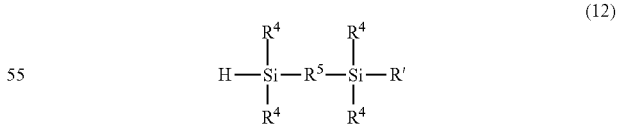

Herein $R^3$, $R^4$, $R^5$, and m1 are as defined above, m5 is a number of 0 to 999, preferably 0 to 100, m6 is a positive number of 1 to 100, preferably 1 to 10, most preferably 1 or 2, m5+m6 is a positive number of 1 to 1,000, preferably 1 to 100. R' is independently hydrogen or $R^3$.

The alkenyl-containing compound used herein includes a (meth)allyl-containing epoxy compound having at least three glycidyl groups and at least three (meth)allyl groups in the molecule, represented by formula (9).

Typical examples of the (meth)allyl-containing epoxy compound having formula (9) are shown below.
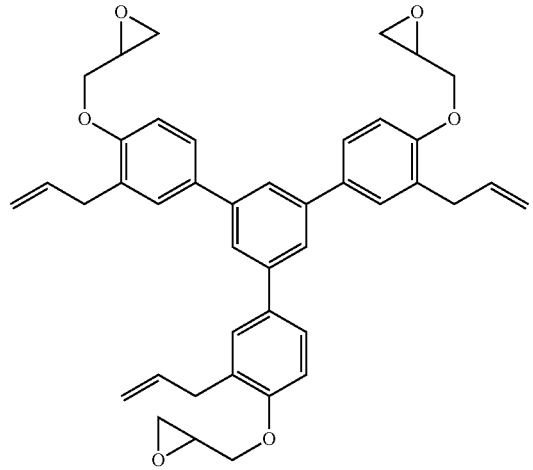
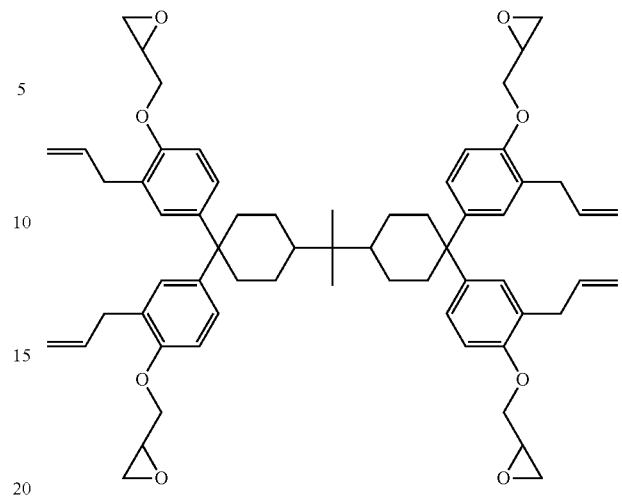
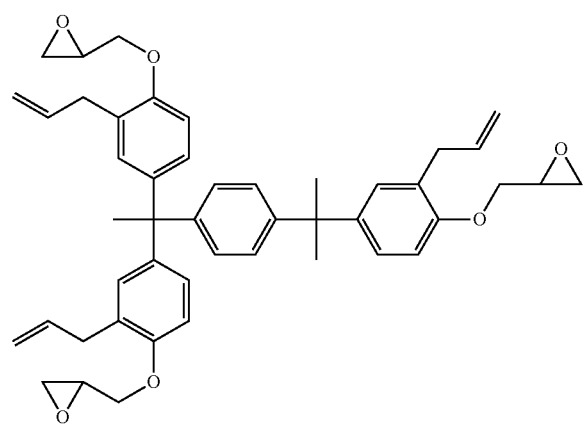
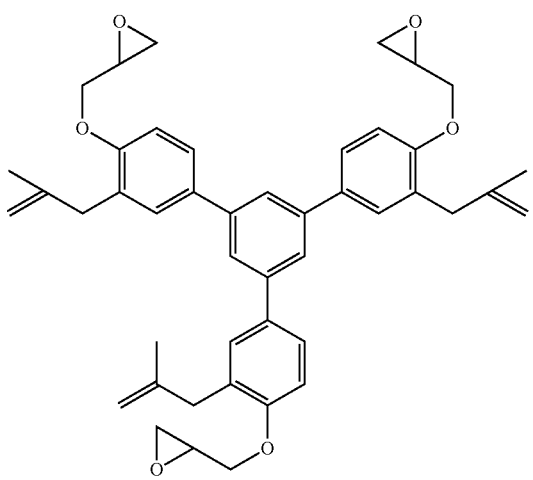
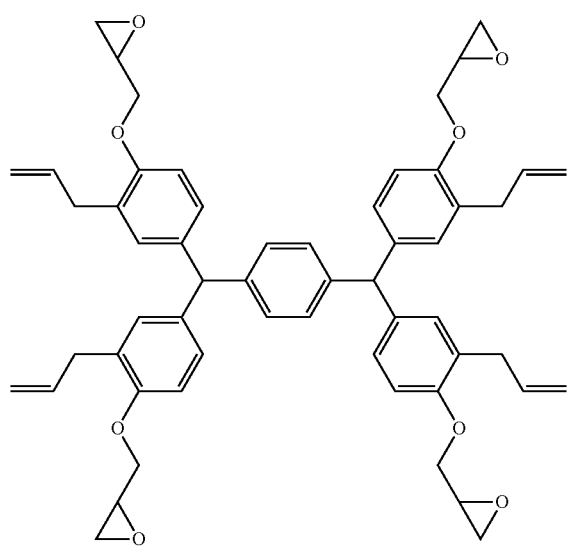

-continued

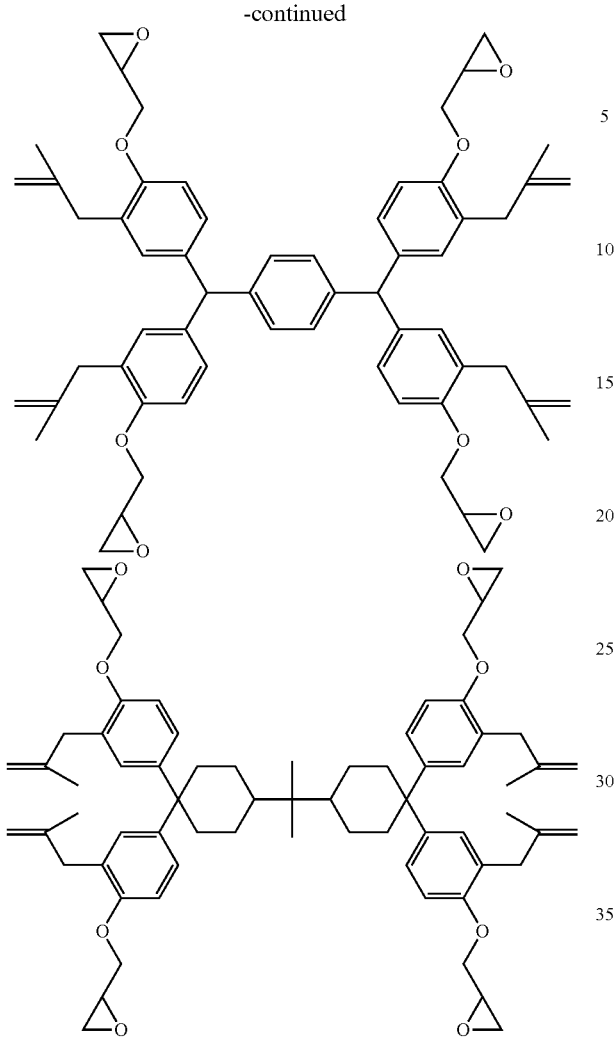

The (meth)allyl-containing epoxy compound having formula (9) may be prepared by reacting a compound having (meth)allyl-containing phenol groups, represented by the general formula (17):

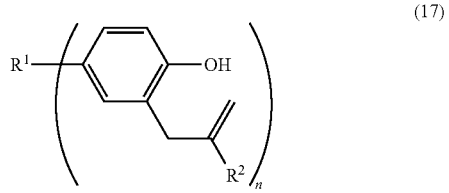
(17)

wherein $R^1$, $R^2$, and n are as defined above, with a 2-halomethyloxirane having the general formula (18):

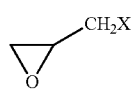
(18)

wherein X is a halogen atom, typically chlorine or bromine.

Typical examples of the compound having (meth)allyl-containing phenol groups, represented by formula (17) are shown below.

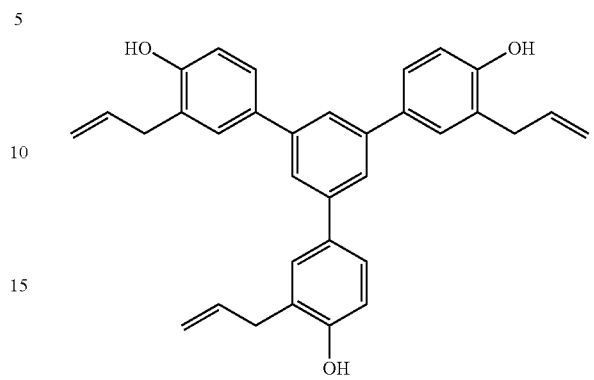

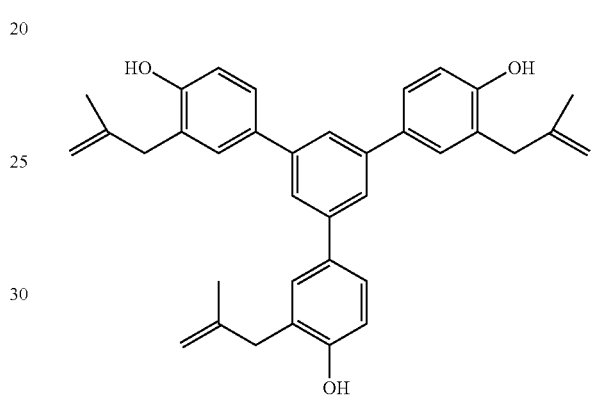

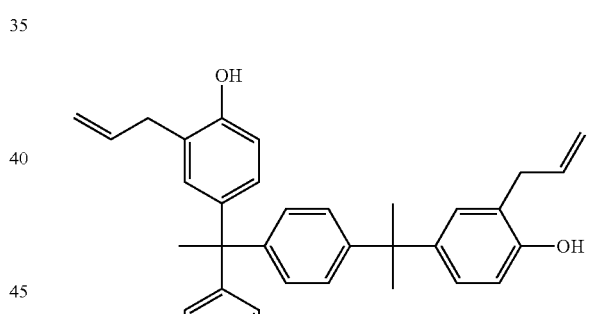

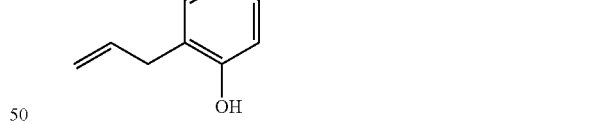

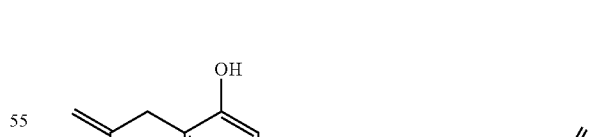

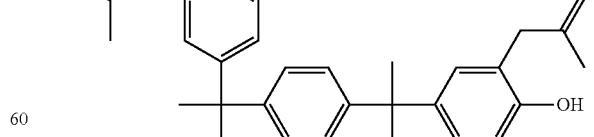

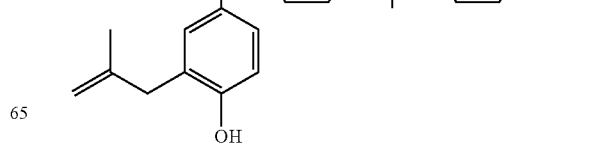

-continued

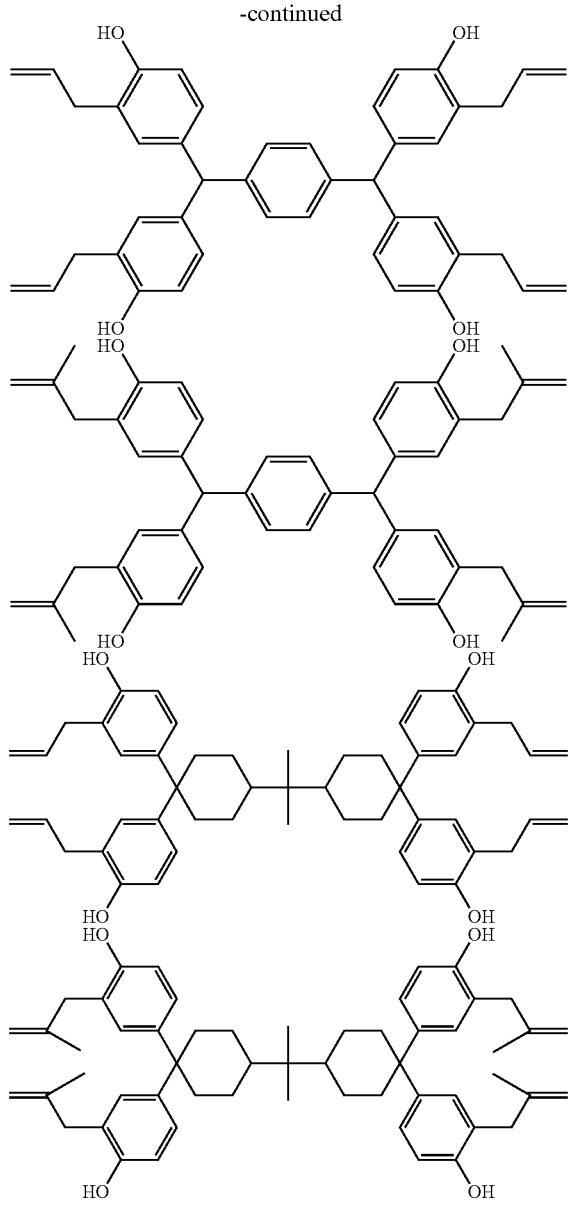

Typical of the 2-halomethyloxirane of formula (18) are 2-chloromethyloxirane and 2-bromomethyloxirane.

The compound of formula (17) may be reacted with the 2-halomethyloxirane of formula (18) in any desired ratio. Typically, the 2-halomethyloxirane of formula (18) is used in an amount of 1 to 10 moles, preferably 2 to 6 moles of halogen groups per mole of phenol groups on the compound of formula (17). Using the 2-halomethyloxirane of formula (18) in a large excess relative to the compound of formula (17), the (meth)allyl-containing epoxy compound of formula (9) is obtained. If the amount of 2-halomethyloxirane of formula (18) relative to the compound of formula (17) is reduced, an oxirane ring on the 2-halomethyloxirane of formula (18) may react with a phenol group on the compound of formula (17) to form a linked component, which does not adversely affect the invention.

In the reaction to form the (meth)allyl-containing epoxy compound of formula (9), a catalyst is optional. Typically, alkali metal hydroxides are used as the catalyst. Suitable alkali metal hydroxides include sodium hydroxide and potassium oxide. The alkali metal hydroxide may be added in solid form or as an aqueous solution or alcohol solution. The alkali metal hydroxide in solid form may be used alone or in admixture and added in divided portions or continuously to the reaction system. On use of an aqueous solution of the alkali metal hydroxide, which means that an excess of water is carried over from the aqueous solution to the reaction system, it is preferred to perform the reaction while removing water from the reaction system. The alkali metal hydroxide is preferably used in an amount of 1.0 to 1.2 equivalents, more preferably 1.0 to 1.1 equivalents per equivalent of phenolic hydroxyl group.

A solvent may be used in the reaction to form the compound of formula (9). If the 2-halomethyloxirane is added in a large excess, it may also serve as the reaction solvent. Optionally, a separate solvent may be added, and in that case, aprotic solvents are preferred. Examples of the aprotic solvent include dimethyl sulfone, dimethyl sulfoxide, dimethylformamide, 1,3-dimethyl-2-imidazolidinone, 1,4-dioxane, tetrahydrofuran, methyl ethyl ketone, methyl isobutyl ketone, toluene, xylene, benzene, pentane, hexane, heptane, octane, and decane. The aprotic solvent is typically used in an amount of 0 to 500% by weight, preferably 0 to 150% by weight based on the weight of 2-halomethyloxirane. When added, the amount of the solvent is preferably at least 5% by weight.

The reaction between the compound of formula (17) and 2-halomethyloxirane of formula (18) is performed at any desired temperature, typically in a range of 40° C. to 200° C., preferably 50° C. to 100° C. The reaction time is about 2 to about 30 hours, preferably 2 to 5 hours.

The reaction product as such or after washing with water is heated in vacuum to remove the excess 2-halomethyloxirane and the solvent, if used, or the like, obtaining the (meth)allyl-containing epoxy compound of formula (9). The epoxy compound is preferably recovered by removing the by-product salt through filtration or water-washing at the end of reaction, and heating in vacuum to distill off the excess 2-halomethyloxirane, solvent and the like.

Typical of the compounds of formulae (10) and (11) to be reacted with the alkenyl-containing compound are organohydrogenpolysiloxanes as shown below.

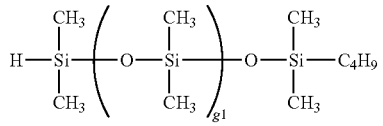

Herein g1 is an integer of 1 to 998.

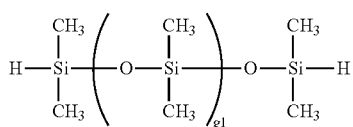

Herein g1 is an integer of 1 to 998.

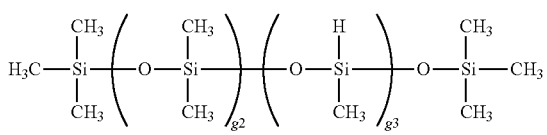

Herein g2 is an integer of 0 to 997, g3 is an integer of 1 to 100, preferably 1 or 2, and g2+g3 satisfies 1≤g2+g3≤998.

Typical of the compounds of formula (12) to be reacted with the alkenyl-containing compound are siloxy-free, hydrosilyl-containing silicon compounds as shown below.

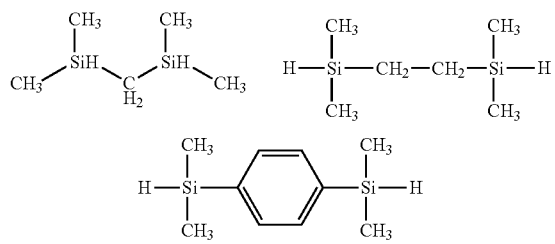

In addition to the (meth)allyl-containing epoxy compound having formula (9), the alkenyl-containing compound used in the reaction step may include one or more compounds selected from compounds having formulae (13) to (16).

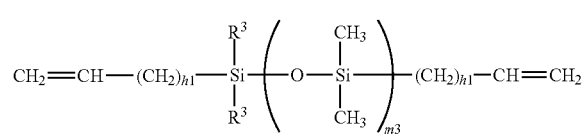

(13)

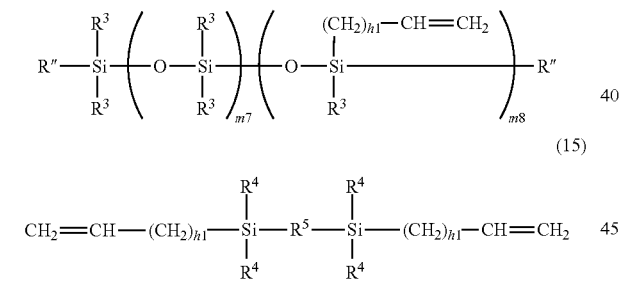

(14)

(15)

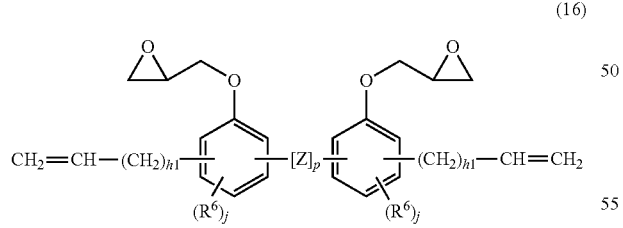

(16)

Herein $R^3$, $R^4$, $R^5$, m3, Z, $R^6$, p, and j are as defined and exemplified above; m7 is a number of 0 to 999, preferably 0 to 100; m8 is a positive number of 1 to 100, preferably 1 to 10, and most preferably 1 or 2; m7+m8 is a positive number of 1 to 1,000, preferably 1 to 100. R" is independently —$(CH_2)_{h1}$—CH=$CH_2$ or $R^3$, and h1 is 0 or 1.

Typical of the compounds having formulae (13) and (14) are alkenyl-containing organopolysiloxanes as shown below.

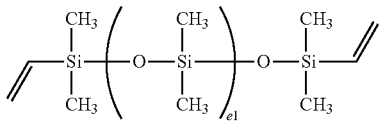

Herein e1 is an integer of 0 to 998.

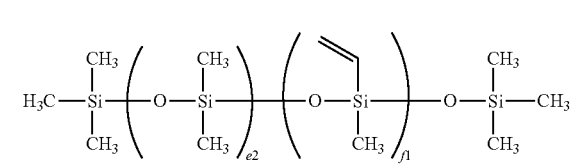

Herein e2 is an integer of 0 to 997, f1 is an integer of 1 to 100, preferably 1 or 2, e2+f1 satisfies 1≤e2+f1≤998.

Typical examples of the compound having formula (15) are shown below.

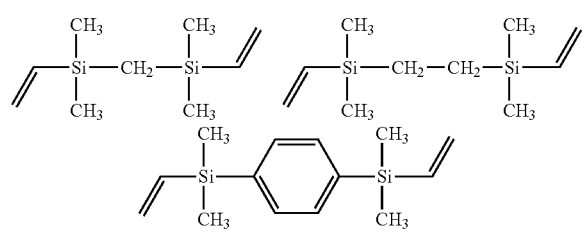

Typical of the compound having formula (16) is an alkenylphenyl compound as shown below.

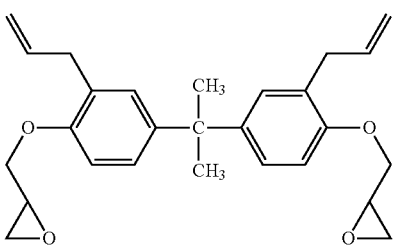 [SMILES: C=CCc1cc(C(C)(C)c2ccc(OCC3CO3)c(CC=C)c2)ccc1OCC1CO1]

An appropriate amount of the compound having formula (13), (14), (15) or (16) used as the alkenyl-containing compound is 0.1 to 12 moles per mole of the (meth)allyl-containing epoxy compound having formula (9).

The epoxy-modified silicone resin may be prepared by conducting addition polymerization (or addition reaction) of the alkenyl-containing compound including the (meth)allyl-containing epoxy compound having formula (9), specifically the (meth)allyl-containing epoxy compound having formula (9) and optionally the compound having formula (13) to (16), and the hydrosilyl-containing organosilicon compound, specifically the compound having formula (10) to (12), preferably while heating the reaction mixture and in the presence of a metal catalyst.

For the reaction of the (meth)allyl-containing epoxy compound having formula (9) and the compound having formula (10) to (12), preferably 1 to 10 moles, more preferably 1.5 to 6 moles of the compound having formula (10) to (12) is used per mole of the (meth)allyl-containing epoxy compound having formula (9).

Also preferably, the (meth)allyl-containing epoxy compound having formula (9), the compound having formula (13) to (16), and the compound having formula (10) to (12) are combined in a molar ratio of 0.05-0.6:0-0.6:0.3-0.8, more preferably 0.05-0.6:0.05-0.6:0.3-0.8, and most preferably 0.05-0.4:0.1-0.6:0.3-0.6. The mixing ratio of these compounds is preferably selected such that the total moles of hydrosilyl groups in the hydrosilyl-containing organosilicon compound(s) to the total moles of alkenyl groups in the alkenyl-containing compound(s) range from 1:0.65 to 1:1.65, more preferably from 1:0.85 to 1:1.25.

In the method, an appropriate amount of organosiloxanes (i.e., compounds having formulae (10), (11), (13) and (14)) charged is 20 to 80% by weight, more preferably 25 to 75% by weight of the total amount of compounds involved in the reaction (i.e., compounds having formulae (9) to (16)). If the organosiloxane amount is less than 20 wt %, the resulting silicone resin may lose flexibility and its film may crack. If the organosiloxane amount exceeds 80 wt %, the resulting silicone resin may not have sufficient heat resistance.

The metal catalyst used in addition polymerization is typically a platinum group metal base catalyst. Exemplary catalysts are platinum, palladium and rhodium base catalysts including elemental platinum group metals such as platinum (inclusive of platinum black), rhodium and palladium; platinum chloride, chloroplatinic acid and chloroplatinic acid salts such as $H_2PtCl_4 \cdot kH_2O$, $H_2PtCl_6 \cdot kH_2O$, $NaHPtCl_6 \cdot kH_2O$, $KHPtCl_6 \cdot kH_2O$, $Na_2PtCl_6 \cdot kH_2O$, $K_2PtCl_4 \cdot kH_2O$, $PtCl_4 \cdot kH_2O$, $PtCl_2$ and $Na_2HPtCl_4 \cdot kH_2O$ wherein k is an integer of 0 to 6, preferably 0 or 6; alcohol-modified chloroplatinic acid (see U.S. Pat. No. 3,220,972); complexes of chloroplatinic acid with olefins (see U.S. Pat. Nos. 3,159,601, 3,159,662 and 3,775,452); platinum group metals such as platinum black and palladium on carriers such as alumina, silica and carbon; rhodium-olefin complexes; chlorotris(triphenylphosphine)rhodium (known as Wilkinson catalyst); and complexes of platinum chloride, chloroplatinic acid or chloroplatinic acid salts with vinyl-containing siloxanes, especially vinyl-containing cyclic siloxanes.

The metal catalyst is used in a catalytic amount, typically 0.0001 to 0.1%, preferably 0.001 to 0.01% by weight based on the total weight of reactants.

Although addition reaction may run even in a solventless system, a solvent may be used if desired. The solvent, if used, is preferably selected from hydrocarbon solvents such as toluene and xylene. An appropriate amount of the solvent is 100 to 900 parts, more preferably 300 to 500 parts by weight per 100 parts by weight of the alkenyl-containing compounds and hydrosilyl-containing organosilicon compounds combined.

The reaction temperature is not particularly limited as long as the catalyst is not deactivated and polymerization is complete within an acceptable time. For example, an appropriate temperature is 40 to 150° C., especially 60 to 120° C. The reaction time may be selected depending on the type and amount of reactants, and is preferably 0.5 to 100 hours, more preferably 0.5 to 30 hours. When the solvent is used, vacuum distillation is carried out at the end of reaction to distill off the solvent.

The reaction procedure is not particularly limited. When the compound of formula (13) to (16) is used as the alkenyl-containing compound, possible procedures include a procedure of reacting the (meth)allyl-containing epoxy compound of formula (9), the compound of formula (10) to (12) and the compound of formula (13) to (16) at the same time; a procedure of previously reacting the (meth)allyl-containing epoxy compound of formula (9) with the compound of formula (10) to (12), and then reacting with the compound of formula (13) to (16); and a procedure of previously reacting the compound of formula (10) to (12) with the compound of formula (13) to (16), and then reacting with the (meth)allyl-containing epoxy compound of formula (9).

The epoxy-modified silicone resin thus obtained has achieved a molecular weight buildup as demonstrated by a Mw of 3,000 to 500,000. The Mw may be controlled by using a monoallyl compound (e.g., o-allylphenol), monohydrosilane or monohydrosiloxane (e.g., triethylhydrosilane) as a molecular weight regulator.

The epoxy-modified silicone resin is useful as a resin material for semiconductor devices and electronic parts. Below, a resin material or curable composition comprising the epoxy-modified silicone resin is described.

Curable Composition

Another embodiment of the invention is a curable composition based on the epoxy-modified silicone resin, which may further comprise a crosslinker for curing purpose. The crosslinker is typically an epoxy compound having at least two epoxy groups on average in the molecule, a phenol compound having at least two phenol groups on average in the molecule, or a mixture thereof. The crosslinker is preferably used in an amount of 0.1 to 50 parts by weight per 100 parts by weight of the epoxy-modified silicone resin. The curable composition thus formulated may be used as an adhesive or a coating agent to semiconductor devices since its cured product has heat resistance and maintains adhesion after high temperature exposure.

Examples of the crosslinker used in the curable (resin) composition include phenol novolak type epoxy resins, cresol novolak type epoxy resins, bisphenol A type epoxy resins such as diglycidyl bisphenol A, bisphenol F type epoxy resins such as diglycidyl bisphenol F, triphenylmethane type epoxy resins such as triphenylolpropane triglycidyl ether, alicyclic epoxy resins such as 3,4-epoxycyclohexyl-methyl-3,4-epoxycyclohexane carboxylate, glycidyl ester resins such as diglycidyl phthalate, diglycidyl hexahydrophthalate and dimethylglycidyl phthalate, and glycidyl amine resins such as tetraglycidyl diaminodiphenylmethane, triglycidyl-p-aminophenol, diglycidylaniline, diglycidyl-toluidine, and tetraglycidyl bisaminomethylcyclohexane, which may be used alone or in admixture.

If necessary, a monofunctional epoxy compound having one epoxy group per molecule may be added. Such crosslinkers are commercially available as EOCN-1020, EOCN-102S, XD-1000, NC-2000-L, EPPN-201, GAN, and NC6000 from Nippon Kayaku Co., Ltd. Other useful crosslinkers include m- and p-cresol novolak resins such as EP-6030G (Asahi Yukizai Corp.), trifunctional phenol compounds such as Tris-P-PA (Honshu Chemical Industry Co., Ltd.), and tetrafunctional phenol compounds such as TEP-TPA (Asahi Yukizai Corp.).

The crosslinker is preferably used in an amount of 0.1 to 50 parts, more preferably 0.1 to 30 parts, and even more preferably 1 to 20 parts by weight per 100 parts by weight of the epoxy-modified silicone resin. A mixture of two or more compounds as mentioned above may be used as the crosslinker.

A catalyst may be added to the composition for the purpose of promoting reaction of the epoxy-modified silicone resin. Suitable cure promoters include organic phosphine compounds such as triphenylphosphine and tricyclohexylphosphine, amino compounds such as trimethylexamethylenediamine, diaminodiphenylmethane, 2-(dimethylaminomethyl)phenol, 2,4,6-tris(dimethylaminomethyl)phenol, and triethanolamine, and imidazole compounds such as 2-methylimidazole, 2-ethylimidazole, 2-phenylimidazole, and 2-phenyl-4,5-dihydroxymethylimidazole. An appropriate amount of the catalyst is 0.1 to 3 parts by weight per 100 parts by weight of the epoxy-modified silicone resin.

Further, a curing co-agent such as acid anhydride may be added to the curable composition in an amount of up to 10 parts by weight per 100 parts by weight of the epoxy-modified silicone resin.

Other optional components such as a filler, silane coupling agent, surfactant and antioxidant may be added to the curable composition.

Suitable fillers include silicates such as talc, calcined clay, uncalcined clay, mica and glass, oxides such as titania, alumina, fused silica (spherical fused silica, ground fused silica) and crystalline silica powder, carbonates such as calcium carbonate, magnesium carbonate and hydrotalcite, hydroxides such as aluminum hydroxide, magnesium hydroxide and calcium hydroxide, sulfates or sulfites such as barium sulfate, calcium sulfate and calcium sulfite, borates such as zinc borate, barium metaborate, aluminum borate, calcium borate and sodium borate, and nitrides such as aluminum nitride, boron nitride and silicon nitride. These fillers may be used alone or in admixture. Useful fillers are commercially available as Aerosil R972, R974 and R976 (Nippon Aerosil Co., Ltd.), SE-2050, SC-2050, SE-1050, SO-E1, SO-C1, SO-E2, SO-C2, SO-E3, SO-E5, and SO-C5 (Admatechs Co., Ltd.), Musil 120A and Musil 130A (Shin-Etsu Chemical Co., Ltd.).

Suitable silane coupling agents include epoxy silane coupling agents and aromatic-containing amino silane coupling agents. These agents may be used alone or in admixture. Exemplary agents include
2-(3,4-epoxycyclohexyl)ethyltrimethoxysilane,
3-glycidoxypropylmethyldimethoxysilane,
3-glycidoxypropyltrimethoxysilane,
3-glycidoxypropylmethyldiethoxysilane,
3-glycidoxypropyltriethoxysilane,
N-phenyl-3-aminopropyltrimethoxysilane, and
N-(vinylbenzyl)-2-aminoethyl-3-aminopropyltrimethoxysilane.

Suitable surfactants include fatty acid esters, glyceric acid esters, zinc stearate, and calcium stearate.

As the antioxidant, phenolic, phosphorus and sulfur base antioxidants are useful. Suitable phenolic antioxidants include 2,6-di-t-butyl-p-cresol, butylated hydroxyanisole, 2,6-di-t-butyl-p-ethylphenol, stearyl-β-(3,5-di-t-butyl-4-hydroxyphenyl)propionate, 2,2'-methylenebis(4-methyl-6-t-butylphenol), 4,4'-butylidene bis(3-methyl-6-t-butylphenol), 3,9-bis[1,1-dimethyl-2-{-(β-t-butyl-4-hydroxy-5-methylphenyl)propionyloxy}ethyl]-2,4,8,10-tetraoxaspiro[5,5]undecane, 1,1,3-tris(2-methyl-4-hydroxy-5-t-butylphenyl)butane, and 1,3,5-trimethyl-2,4,6-tris(3,5-di-t-butyl-4-hydroxybenzyl)-benzene.

Suitable phosphorus base antioxidants include triphenyl phosphite, diphenylalkyl phosphites, phenyldialkyl phosphites, tri(nonylphenyl) phosphite, trilauryl phosphite, trioctadecyl phosphite, triphenyl phosphite, distearyl pentaerythritol diphosphite, tris(2,4-di-t-butylphenyl) phosphite, diisodecyl pentaerythritol diphosphite, di(2,4-di-t-butylphenyl) pentaerythritol diphosphite, tristearyl sorbitol triphosphite, and tetrakis(2,4-di-t-butylphenyl)-4,4'-biphenyl diphosphonate.

Suitable sulfur base antioxidants include dilauryl thiodipropionate, distearyl thiodipropionate, dimyristyl thiodipropionate, 2,4-bis(n-octylthio)-6-(4-hydroxy-3,5-di-t-butylanilino)-1,3,5-triazine and 2,4-bis[(octylthio)methyl]-o-cresol. These antioxidants may be used alone or in admixture.

Other optional components may be added to the curable composition as such, or they may be dissolved or dispersed in an organic solvent before the resulting solution or dispersion is added to the curable composition.

On use, the curable (resin) composition may be dissolved in a solvent and applied onto a substrate or support by coating, specifically spin coating, roll coating or die coating. Suitable solvents include ketones such as cyclohexanone, cyclopentanone and methyl-2-n-pentyl ketone; alcohols such as 3-methoxybutanol, 3-methyl-3-methoxybutanol, 1-methoxy-2-propanol, and 1-ethoxy-2-propanol; ethers such as propylene glycol monomethyl ether, ethylene glycol monomethyl ether, propylene glycol monoethyl ether, ethylene glycol monoethyl ether, dipropylene glycol dimethyl ether, and diethylene glycol dimethyl ether; esters such as propylene glycol monomethyl ether acetate (PGMEA), propylene glycol monoethyl ether acetate, ethyl lactate, ethyl pyruvate, butyl acetate, methyl 3-methoxypropionate, ethyl 3-ethoxypropionate, t-butyl acetate, t-butyl propionate, propylene glycol mono-t-butyl ether acetate, y-butyrolactone, which may be used alone or in admixture. An appropriate amount of the solvent is 25 to 400 parts by weight per 100 parts by weight of the epoxy-modified silicone resin.

The curable composition is applied onto a substrate (for electronic parts) such as a semiconductor substrate (Si, SiN), liquid crystal substrate or quartz substrate by the coating technique in such a coating weight as to form a film of about 0.01 to about 100 m thick, and optionally heated at 130 to 200° C., preferably 150 to 190° C. for 30 minutes to 3 hours, yielding a cured product.

The curable composition finds use as a resin material, for example, an encapsulant or adhesive used in the fabrication of semiconductor devices, and a protective film material on the surface of electronic parts such as diodes, transistors, ICs and LSIs. Typical resin materials include junction coat film, passivation film and buffer coat film on semiconductor device surface, alpha-ray shielding film for LSIs, interlayer dielectric film for multilayer interconnects, conformal coat on printed circuit boards, ion implantation mask, and surface protective film on solar panels.

EXAMPLE

Examples of the invention are given below by way of illustration and not by way of limitation. All parts are by weight (pbw).

In Examples, the weight average molecular weight (Mw) of a polymer is measured by gel permeation chromatography (GPC) versus monodisperse polystyrene standards using GPC columns TSKgel Super HZM-H (Tosoh Corp.) under analytical conditions: flow rate 0.6 mL/min, tetrahydrofuran as the elute, and column temperature 40° C.

Synthesis of Allyl-Containing Epoxy Compounds

Synthesis Example 1

In a 1-L separable flask equipped with a nitrogen gas inlet tube, thermometer, Dimroth condenser, vacuum controller, and aspirator, 109 g (0.2 mol) of the allyl-containing compound of the following formula was dissolved in 100 g of toluene and 167 g (1.8 mol) of 2-chloromethyloxirane.

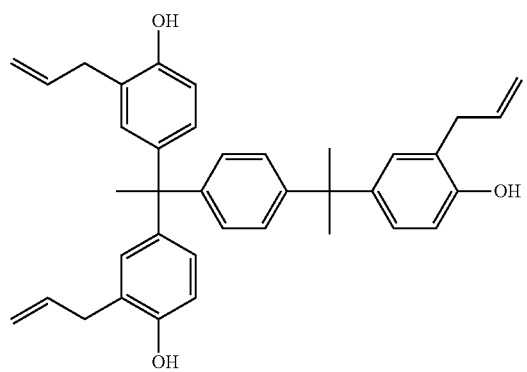 [SMILES: C=CCc1cc(C(C)(C)c2ccc(C(C)(c3ccc(O)c(CC=C)c3)c3ccc(O)c(CC=C)c3)cc2)ccc1O]

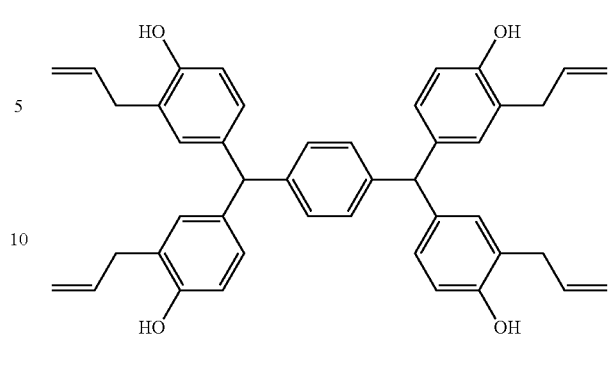

To the solution, 26.4 g (0.66 mol) of KOH was gradually added. The contents were heated at 60° C. and allowed to react for 3 hours. At the end of reaction, 300 g of pure water was added to the reaction solution to dissolve the precipitated salt whereupon the reaction solution separated into an organic layer and a water layer. The organic layer was 332 g and the water layer was 369 g. From the organic layer, 2-chloromethyloxirane and toluene were distilled off in vacuum, yielding 135 g of a yellowish brown solid compound having the following formula (i-1).

To the solution, 132 g of 20 wt % KOH methanol solution (0.66 mol of KOH) was slowly added dropwise. The contents were heated at 60° C. and allowed to react for 3 hours. At the end of reaction, 300 g of pure water was added to the reaction solution to dissolve the precipitated salt whereupon the reaction solution separated into an organic layer and a water layer. The organic layer was 442 g and the water layer was 382 g. From the organic layer, 2-chloromethyloxirane and the solvent were distilled off in vacuum, yielding 155 g of a brown solid compound having the following formula (i-5).

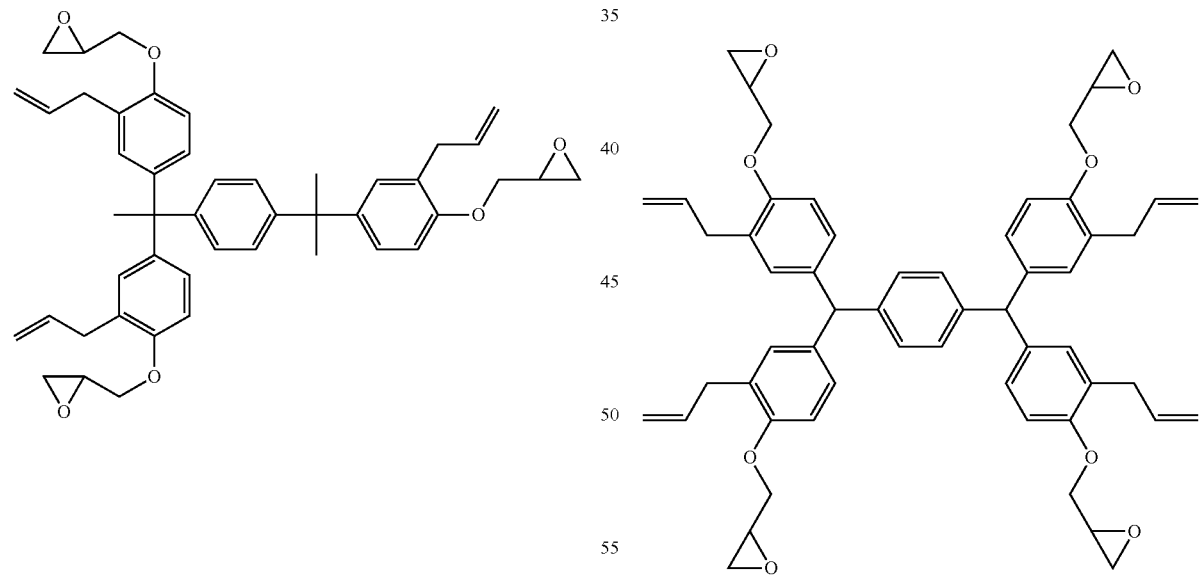

Synthesis Example 2

In a 1-L separable flask equipped with a nitrogen gas inlet tube, thermometer, Dimroth condenser, dropping funnel, vacuum controller, and aspirator, 127 g (0.2 mol) of the allyl-containing compound of the following formula was dissolved in 100 g of toluene and 167 g (1.8 mol) of 2-chloromethyloxirane.

Preparation of Epoxy-Modified Silicone Resins

The compounds used in Examples and Comparative Examples are shown below.

i-1: Compound obtained in Synthesis Example 1

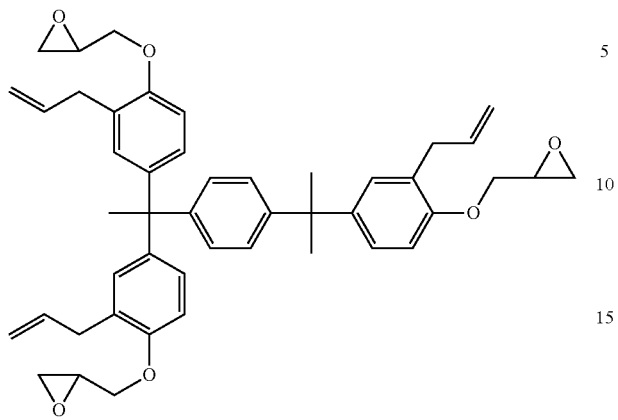

i-2: available from Shin-Etsu Chemical Co., Ltd.

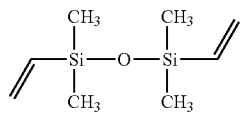

i-3: available from Shin-Etsu Chemical Co., Ltd.

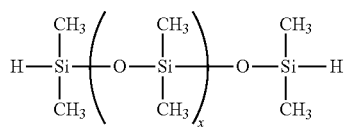

i-4: available from Shin-Etsu Chemical Co., Ltd.

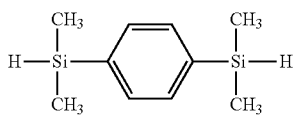

i-5: Compound obtained in Synthesis Example 2

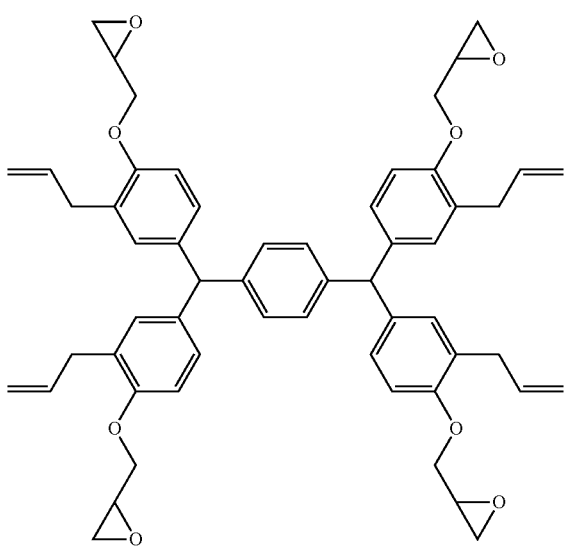 [SMILES: C=CCc1cc(C(c2ccc(C(c3ccc(OCC4CO4)c(CC=C)c3)c3ccc(OCC4CO4)c(CC=C)c3)cc2)c2ccc(OCC3CO3)c(CC=C)c2)ccc1OCC1CO1]

Epoxy compound RE-810NM available from Nippon Kayaku Co., Ltd.

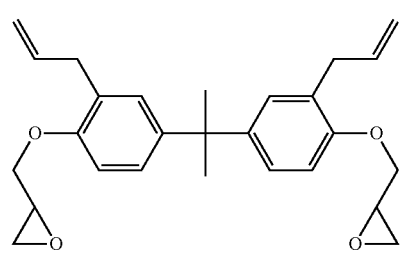 [SMILES: C=CCc1cc(C(C)(C)c2ccc(OCC3CO3)c(CC=C)c2)ccc1OCC1CO1]

Example 1

A 2-L separable flask equipped with a nitrogen gas inlet tube, thermometer, Dimroth condenser, vacuum controller, and aspirator was charged with 35.6 g (0.05 mol) of the compound having formula (i-1) and 37.2 g (0.20 mol) of the compound having formula (i-2), then with 1,000 g of toluene, and heated at 70° C. Thereafter, 0.25 g of a toluene solution of chloroplatinic acid (platinum concentration 0.5 wt %) was added and 88.4 g (0.03 mol) of the compound having formula (i-3) wherein x=38 and 47.6 g (0.245 mol) of the compound having formula (i-4) were added dropwise over 1 hour. The total moles of hydrosilyl groups to the total moles of alkenyl groups was 1/1. At the end of dropwise addition, the reaction solution was heated at 100° C. and aged for 6 hours. Toluene was distilled off in vacuum from the reaction solution, yielding a resin (I) having a Mw of 45,000. The resin had an organosiloxy content of 60 wt %. The resin corresponds to formula (1) wherein A=0.10, B=0.52, and C=0.38.

Example 2

A 2-L separable flask equipped with a nitrogen gas inlet tube, thermometer, Dimroth condenser, vacuum controller, and aspirator was charged with 53.5 g (0.075 mol) of the compound having formula (i-1), then with 1,000 g of toluene, and heated at 70° C. Thereafter, 0.25 g of a toluene solution of chloroplatinic acid (platinum concentration 0.5 wt %) was added and 166.2 g (0.023 mol) of the compound having formula (i-3) wherein x=100 and 17.5 g (0.090 mol) of the compound having formula (i-4) were added dropwise over 1 hour. The total moles of hydrosilyl groups to the total moles of alkenyl groups was 1/1. At the end of dropwise addition, the reaction solution was heated at 100° C. and aged for 3 hours. Toluene was distilled off in vacuum from the reaction solution, yielding a resin (II) having a Mw of 55,000. The resin had an organosiloxy content of 70 wt %. The resin corresponds to formula (1) wherein A=0.40 and B=0.60.

Example 3

A 2-L separable flask equipped with a nitrogen gas inlet tube, thermometer, Dimroth condenser, vacuum controller, and aspirator was charged with 106.9 g (0.15 mol) of the compound having formula (i-1) and 9.3 g (0.05 mol) of the compound having formula (i-2), then with 1,000 g of toluene, and heated at 70° C. Thereafter, 0.25 g of a toluene solution of chloroplatinic acid (platinum concentration 0.5 wt %) was added and 54.5 g (0.075 mol) of the compound having formula (i-3) wherein x=8 and 38.9 g (0.2 mol) of the compound having formula (i-4) were added dropwise over 1 hour. The total moles of hydrosilyl groups to the total moles of alkenyl groups was 1/1. At the end of dropwise addition, the reaction solution was heated at 100° C. and aged for 6 hours. Toluene was distilled off in vacuum from the reaction solution, yielding a resin (III) having a Mw of 30,000. The resin had an organosiloxy content of 30 wt %. The resin corresponds to formula (1) wherein A=0.32, B=0.58, and C=0.11.

Example 4

A 2-L separable flask equipped with a nitrogen gas inlet tube, thermometer, Dimroth condenser, vacuum controller, and aspirator was charged with 71.3 g (0.1 mol) of the compound having formula (i-1), then with 800 g of toluene, and heated at 70° C. Thereafter, 0.25 g of a toluene solution of chloroplatinic acid (platinum concentration 0.5 wt %) was added and 108.9 g (0.15 mol) of the compound having formula (i-3) wherein x=8 was added dropwise over 1 hour. The reaction solution was heated at 100° C. and aged for 6 hours. Toluene was distilled off in vacuum from the reaction solution, yielding a resin (IV) having a Mw of 28,000. The resin had an organosiloxy content of 60 wt %. The resin corresponds to formula (1) wherein A=0.4 and B=0.6.

Example 5

A 2-L separable flask equipped with a nitrogen gas inlet tube, thermometer, Dimroth condenser, vacuum controller, and aspirator was charged with 43.0 g (0.05 mol) of the compound having formula (i-5) and 37.2 g (0.20 mol) of the compound having formula (i-2), then with 1,000 g of toluene, and heated at 70° C. Thereafter, 0.25 g of a toluene solution of chloroplatinic acid (platinum concentration 0.5 wt %) was added and 117.8 g (0.04 mol) of the compound having formula (i-3) wherein x=38 and 50.5 g (0.26 mol) of the compound having formula (i-4) were added dropwise over 1 hour. The total moles of hydrosilyl groups to the total moles of alkenyl groups was 1/1. At the end of dropwise addition, the reaction solution was heated at 100° C. and aged for 6 hours. Toluene was distilled off in vacuum from the reaction solution, yielding a resin (V) having a Mw of 37,000. The resin had an organosiloxy content of 62 wt %. The resin corresponds to formula (1) wherein A=0.09, B=0.55, and C=0.36.

Example 6

A 2-L separable flask equipped with a nitrogen gas inlet tube, thermometer, Dimroth condenser, vacuum controller, and aspirator was charged with 35.6 g (0.05 mol) of the compound having formula (i-1), 18.6 g (0.10 mol) of the compound having formula (i-2), and 42.1 g (0.1 mol) of RE-810NM, then with 1,000 g of toluene, and heated at 70° C. Thereafter, 0.25 g of a toluene solution of chloroplatinic acid (platinum concentration 0.5 wt %) was added and 88.4 g (0.03 mol) of the compound having formula (i-3) wherein x=38 and 47.6 g (0.245 mol) of the compound having formula (i-4) were added dropwise over 1 hour. The total moles of hydrosilyl groups to the total moles of alkenyl groups was 1/1. At the end of dropwise addition, the reaction solution was heated at 100° C. and aged for 6 hours. Toluene was distilled off in vacuum from the reaction solution, yielding a resin (VI) having a Mw of 45,000. The resin had an organosiloxy content of 46 wt %. The resin corresponds to formula (1) wherein A=0.10, B=0.52, and C=0.38.

Comparative Example 1

A 2-L separable flask equipped with a nitrogen gas inlet tube, thermometer, Dimroth condenser, vacuum controller, and aspirator was charged with 42.1 g (0.1 mol) of RE-810NM and 32.6 g (0.175 mol) of the compound having formula (i-2), then with 1,000 g of toluene, and heated at 70° C. Thereafter, 0.25 g of a toluene solution of chloroplatinic acid (platinum concentration 0.5 wt %) was added and 103.1 g (0.035 mol) of the compound having formula (i-3) wherein x=38 and 46.7 g (0.24 mol) of the compound having formula (i-4) were added dropwise over 1 hour. The total moles of hydrosilyl groups to the total moles of alkenyl groups was 1/1. At the end of dropwise addition, the reaction solution was heated at 100° C. and aged for 6 hours. Toluene was distilled off in vacuum from the reaction solution, yielding a resin (VII) having a Mw of 52,000. The resin had an organosiloxy content of 54 wt %. The resin corresponds to formula (1) wherein A=0, B=0.5, and C=0.5.

Comparative Example 2

A 2-L separable flask equipped with a nitrogen gas inlet tube, thermometer, Dimroth condenser, vacuum controller, and aspirator was charged with 33.5 g (0.05 mol) of the compound having formula (E) below and 37.2 g (0.2 mol) of the compound having formula (i-2), then with 1,000 g of toluene, and heated at 70° C. Thereafter, 0.25 g of a toluene solution of chloroplatinic acid (platinum concentration 0.5 wt %) was added and 88.4 g (0.03 mol) of the compound having formula (i-3) wherein x=38 and 47.6 g (0.245 mol) of the compound having formula (i-4) were added dropwise over 1 hour. The total moles of hydrosilyl groups to the total moles of alkenyl groups was 1/1. At the end of dropwise addition, the reaction solution was heated at 100° C. and aged for 6 hours. Toluene was distilled off in vacuum from the reaction solution, yielding a resin (VIII) having a Mw of 35,000. The resin had an organosiloxy content of 61 wt %.

Compound Having Formula (E)

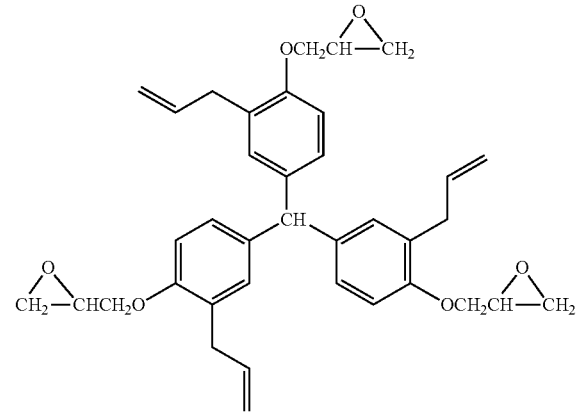

Preparation of Curable (Adhesive) Compositions

Examples 7 to 12 and Comparative Examples 3, 4

Curable compositions were prepared by mixing an epoxy-modified silicone resin (resins (I) to (VIII) obtained in Examples and Comparative Examples), a crosslinker (CL1 to CL3) having the following structural formula, and a solvent in accordance with the formulation (type and pbw) shown in Table 1.

Crosslinker CL1

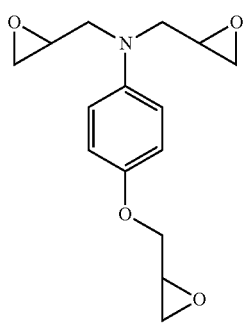 [SMILES: c1cc(N(CC2CO2)CC2CO2)ccc1OCC1CO1]

Crosslinker CL2

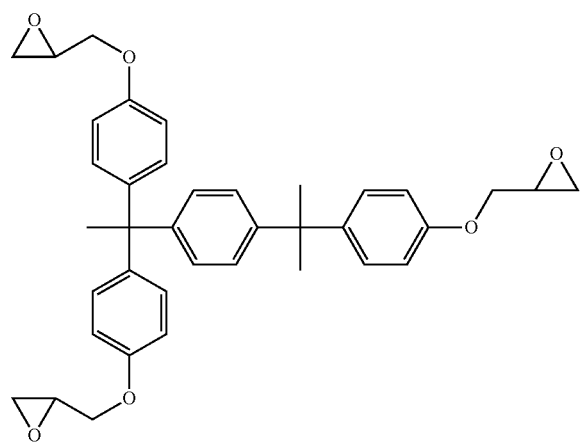 [SMILES: CC(C)(c1ccc(OCC2CO2)cc1)c1ccc(C(C)(c2ccc(OCC3CO3)cc2)c2ccc(OCC3CO3)cc2)cc1]

Crosslinker CL3

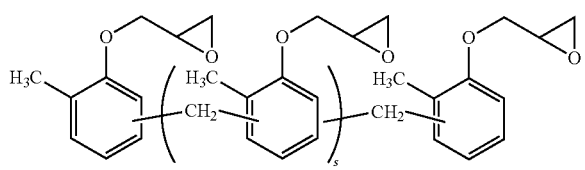

s = 3-6

The curable compositions obtained in Examples were evaluated for outer appearance, heat resistance, adhesion, and solvent resistance by the following tests. The results are shown in Table 2.

Outer Appearance

The curable composition solution was spin coated onto a silicon substrate, then baked on a hot plate at 130° C. for 2 minutes and further at 190° C. for 1 hour, forming a cured film of 30 μm thick. The cured film was inspected for outer appearance by visual observation and tack by finger touch. The film was rated good "○" when neither cracks nor tack was found and poor "x" when cracks and tack were found.

Heat Resistance Test

The curable composition solution was spin coated onto a silicon substrate, then baked on a hot plate at 130° C. for 2 minutes and further at 190° C. for 1 hour, forming a cured film of 30 μm thick. The cured film was placed in a nitrogen atmosphere oven at 250° C. for 2 hours and then heated on a hot plate at 270° C. for 10 minutes. The outer appearance of the film was observed for anomalies such as voids and peels. The film was rated good "○" when appearance anomalies were not found and poor "x" when appearance anomalies were found.

Adhesion Test

The curable composition solution was spin coated onto a silicon substrate or copper-deposited silicon substrate, then baked at 130° C. for 2 minutes and further at 190° C. for 1 hour, forming a cured film. The cured film was placed in a nitrogen atmosphere oven at 250° C. for 2 hours and then heated on a hot plate at 270° C. for 10 minutes. The film was evaluated for adhesion after temperature exposure by the cross-cut peeling test of JIS K5400 at room temperature. In Table 2, the fractional number represents the number of unpeeled sections per 100 cross-cut sections. Specifically, 100/100 means that all sections are kept intact or unpeeled, and 0/100 means that all sections are peeled off.

Solvent Resistance Test

The curable composition solution was spin coated onto a 6-inch (150 mm diameter) silicon wafer, forming a coating of 30 μm thick. The coating was heat dried at 150° C. for 2 minutes and then at 200° C. for 2 minutes, after which it was immersed in N-methylpyrrolidone (NMP) at 25° C. for 10 minutes. The coating was visually inspected whether or not it was dissolved away. The coating was rated good "○" when coating dissolution was not observed and poor "x" when coating dissolution was observed.

TABLE 1

| | | Resin | pbw | Crosslinker | pbw | Catalyst | pbw | Solvent | pbw |
|---|---|---|---|---|---|---|---|---|---|
| Example | 7 | (I) | 100 | CL1 | 15 | — | 0 | cyclopentanone | 100 |
| | 8 | (II) | 100 | CL2 | 10 | triphenylphosphine | 1 | cyclopentanone | 100 |
| | 9 | (III) | 100 | CL3 | 10 | 2-phenyl-4,5-dihydroxy-methylimidazole | 0.5 | PGMEA | 65 |
| | 10 | (IV) | 100 | CL1 | 15 | — | 0 | cyclopentanone | 100 |
| | 11 | (V) | 100 | CL1 | 10 | — | 0 | cyclopentanone | 100 |
| | 12 | (VI) | 100 | CL1 | 10 | — | 0 | cyclopentanone | 100 |
| Comparative | 3 | (VII) | 100 | CL1 | 10 | — | 0 | cyclopentanone | 100 |
| Example | 4 | (VIII) | 100 | CL1 | 10 | — | 0 | cyclopentanone | 100 |

* PGMEA: propylene glycol monomethyl ether acetate

TABLE 2

| | | Example | | | | | | Comparative Example | |
|---|---|---|---|---|---|---|---|---|---|
| | | 7 | 8 | 9 | 10 | 11 | 12 | 3 | 4 |
| Outer appearance | | ○ | ○ | ○ | ○ | ○ | ○ | ○ | ○ |
| Heat resistance | | ○ | ○ | ○ | ○ | ○ | ○ | X | X |
| Adhesion (cross-cut peeling test) | Silicon | 100/100 | 100/100 | 100/100 | 100/100 | 100/100 | 100/100 | 90/100 | 85/100 |
| | Cu-deposited silicon | 100/100 | 100/100 | 100/100 | 100/100 | 100/100 | 100/100 | 70/100 | 60/100 |
| Solvent resistance | | ○ | ○ | ○ | ○ | ○ | ○ | ○ | ○ |

It has been demonstrated that a curable composition comprising the epoxy-modified silicone resin of the invention cures into a cured film having improved heat resistance and adhesion.

It is noted that the invention is not limited to the aforementioned embodiments. While the embodiments are merely exemplary, any embodiments having substantially the same construction as the technical concept set forth in the following claims and exerting equivalent functions and results are believed to be within the spirit and scope of the invention.

Japanese Patent Application No. 2016-001921 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An epoxy-modified silicone resin having a weight average molecular weight of 3,000 to 500,000, represented by the general formula (1):

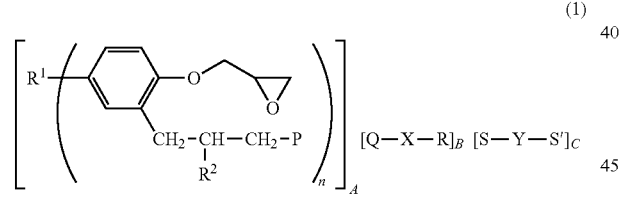

(1)

wherein $R^1$ is a trivalent or tetravalent $C_3$-$C_{20}$ hydrocarbon group, $R^2$ is hydrogen or methyl, n is 3 or 4, A is a number of 0.05 to 0.6, B is a number of 0.3 to 0.8, C is a number of 0 to 0.6, A+B+C=1, Q-X-R is independently an organic group of the following formula (2), (3) or (4):

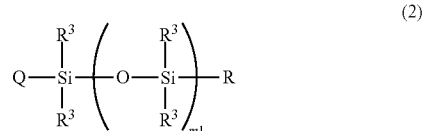

(2)

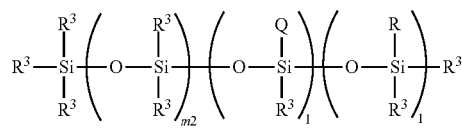

(3)

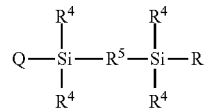

(4)

wherein $R^3$ is independently a substituted or unsubstituted, $C_1$-$C_8$ monovalent hydrocarbon group, $R^4$ is independently a $C_1$-$C_8$ monovalent hydrocarbon group, $R^5$ is a $C_1$-$C_{15}$ divalent hydrocarbon group, m1 is a positive number of 1 to 1,000, m2 is a number of 0 to 998, S—Y—S' is independently an organic group of the following formula (5), (6), (7) or (8):

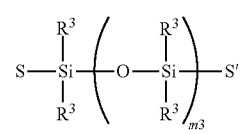

(5)

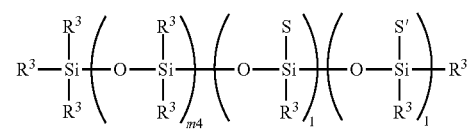

(6)

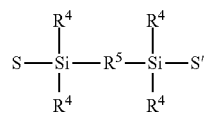

(7)

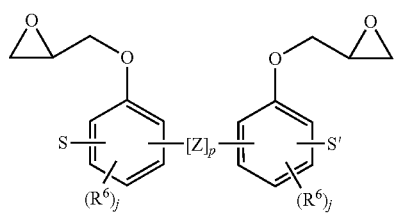

(8)

wherein $R^3$, $R^4$, and $R^5$ are as defined above, m3 is a positive number of 1 to 1,000, m4 is a number of 0 to 998, Z is a $C_1$-$C_{15}$ divalent organic group, p is 0 or 1, $R^6$ which may be the same or different is a $C_1$-$C_4$ alkyl or alkoxy group, j is 0, 1 or 2, P and Q each designate a valence bond, P bonds to Q, R is $R^3$ or a valence bond to P or S, S is —$(CH_2)_h$— to bond to R, h is 2 or 3, and S' is $R^3$ or S.

2. The epoxy-modified silicone resin of claim 1 wherein A+B is 0.4 to 1.0.

3. A curable composition comprising the epoxy-modified silicone resin of claim 1 and a crosslinker.

4. An electronic part comprising a cured product of the curable composition of claim 3.

5. A method for preparing an epoxy-modified silicone resin having a weight average molecular weight of 3,000 to 500,000, comprising the step of reacting an alkenyl-containing compound including a (meth)allyl-containing epoxy compound having the general formula (9) with at least one compound selected from compounds having the general formulae (10) to (12),

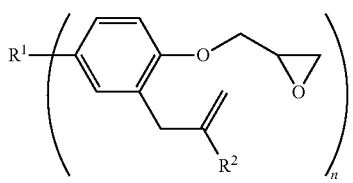

wherein $R^1$ is a trivalent or tetravalent $C_3$-$C_{20}$ hydrocarbon group, $R^2$ is hydrogen or methyl, and n is 3 or 4,

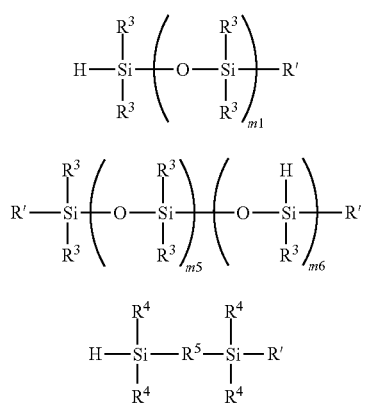

wherein $R^3$ is independently a substituted or unsubstituted, $C_1$-$C_8$ monovalent hydrocarbon group, $R^4$ is independently a $C_1$-$C_8$ monovalent hydrocarbon group, $R^5$ is a $C_1$-$C_{15}$ divalent hydrocarbon group, m1 is a positive number of 1 to 1,000, m5 is a number of 0 to 999, m6 is a number of 1 to 100, m5+m6 is a positive number of 1 to 1,000, and R' is independently hydrogen or $R^3$.

6. The method of claim 5 wherein 1 mole of the (meth) allyl-containing epoxy compound having formula (9) is reacted with 1 to 10 moles of the compound having formula (10), (11) or (12).

7. The method of claim 5 wherein the alkenyl-containing compound includes, in addition to the (meth)allyl-containing epoxy compound having formula (9), at least one compound selected from compounds having formulae (13) to (16):

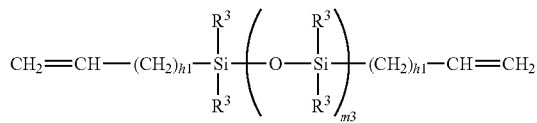

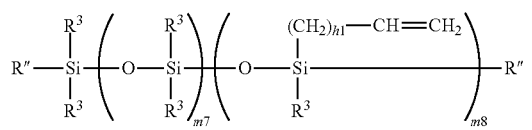

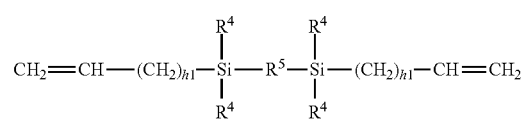

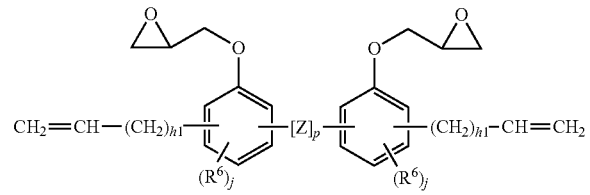

wherein $R^3$, $R^4$, and $R^5$ are as defined above, m3 is a positive number of 1 to 1,000, m7 is a number of 0 to 999, m8 is a number of 1 to 100, m7+m8 is a positive number of 1 to 1,000, R" is independently —$(CH_2)_{h1}$—$CH$=$CH_2$ or $R^3$, h1 is 0 or 1, Z is a $C_1$-$C_{15}$ divalent organic group, p is 0 or 1, $R^6$ which may be the same or different is a $C_1$-$C_4$ alkyl or alkoxy group, and j is 0, 1 or 2.

8. The method of claim 7 wherein in the reacting step, the (meth)allyl-containing epoxy compound having formula (9), the compound selected from formulae (13) to (16), and the compound selected from formulae (10) to (12) are combined in a molar ratio of 0.05-0.6:0.05-0.6:0.3-0.8.

9. The method of claim 5 wherein an amount of organosiloxanes is 20 to 80% by weight based on the total weight of compounds involved in the reaction.

\* \* \* \* \*